United States Patent
Martynov et al.

(10) Patent No.: US 10,962,502 B2
(45) Date of Patent: Mar. 30, 2021

(54) HYDROGEN DETECTOR FOR GAS AND FLUID MEDIA

(71) Applicant: JOINT STOCK COMPANY "AKME-ENGINEERING", Moscow (RU)

(72) Inventors: Petr Nikiforovich Martynov, Obninsk Kaluzhskaya obl. (RU); Mi hail Efimovich Chernov, Obninsk Kaluzhskaya obl. (RU); Alexsey Nikolaevich Storozhenko, Obninsk Kaluzhskaya obl. (RU); Vasiliy Mikhaylovich Shelemet'Ev, Obninsk Kaluzhskaya obl. (RU); Roman Petrovich Sadovnichiy, Obninsk Kaluzhskaya obl. (RU)

(73) Assignee: JOINT STOCK COMPANY "AKME-ENGINEERING", Moscow (RU)

( * ) Notice: Subject to any disclaimer, the term of this patent is extended or adjusted under 35 U.S.C. 154(b) by 160 days.

(21) Appl. No.: 15/536,218

(22) PCT Filed: Nov. 16, 2015

(86) PCT No.: PCT/RU2015/000789
§ 371 (c)(1),
(2) Date: Jun. 15, 2017

(87) PCT Pub. No.: WO2016/099329
PCT Pub. Date: Jun. 23, 2016

(65) Prior Publication Data
US 2017/0322176 A1  Nov. 9, 2017

(30) Foreign Application Priority Data

Dec. 15, 2014 (RU) .................................. 2014150468

(51) Int. Cl.
| | |
|---|---|
| *G01N 27/417* | (2006.01) |
| *G01N 27/407* | (2006.01) |
| *G01N 27/40* | (2006.01) |

(52) U.S. Cl.
CPC ............ *G01N 27/417* (2013.01); *G01N 27/40* (2013.01); *G01N 27/4074* (2013.01); *G01N 27/4077* (2013.01); *G01N 27/4078* (2013.01)

(58) Field of Classification Search
CPC .......... G01N 27/4074; G01N 27/4078; G01N 27/4076; G01N 27/4067; G01N 33/005
See application file for complete search history.

(56) References Cited

U.S. PATENT DOCUMENTS

2002/0103069 A1 * 8/2002 Young .................... C03C 3/064
501/57

FOREIGN PATENT DOCUMENTS

CN           104003621    *  8/2014  .......... C03C 13/003

OTHER PUBLICATIONS

English translation of RU90907U1 (Year: 2010).*
Machine English Translation of CN 101003621 (Year: 2014).*

* cited by examiner

*Primary Examiner* — Gurpreet Kaur
(74) *Attorney, Agent, or Firm* — Stephen Y. Liu; James R. Gourley; Carstens & Cahoon, LLP

(57) ABSTRACT

A hydrogen detector for gas and fluid media is disclosed. The detector includes a selective membrane and a housing. Within the housing is a potential measuring unit and a ceramic sensing element made of a solid electrolyte. A standard electrode is located within a cavity of the ceramic sensing element and a porous platinum electrode is applied to an external layer of the ceramic sensing element. A potential measuring unit passes through a sealed lead-in at the upper end of the housing and is brought out to the standard electrode. The selective membrane, which is attached to a hole in the end of the lower bushing, is closed with a plug. The cavity limited by the inner surface of the lower bushing, the external part of the bottom of the ceramic sensing element and the inner surfaces of the selective membrane and the plug is leak-tight.

6 Claims, 1 Drawing Sheet

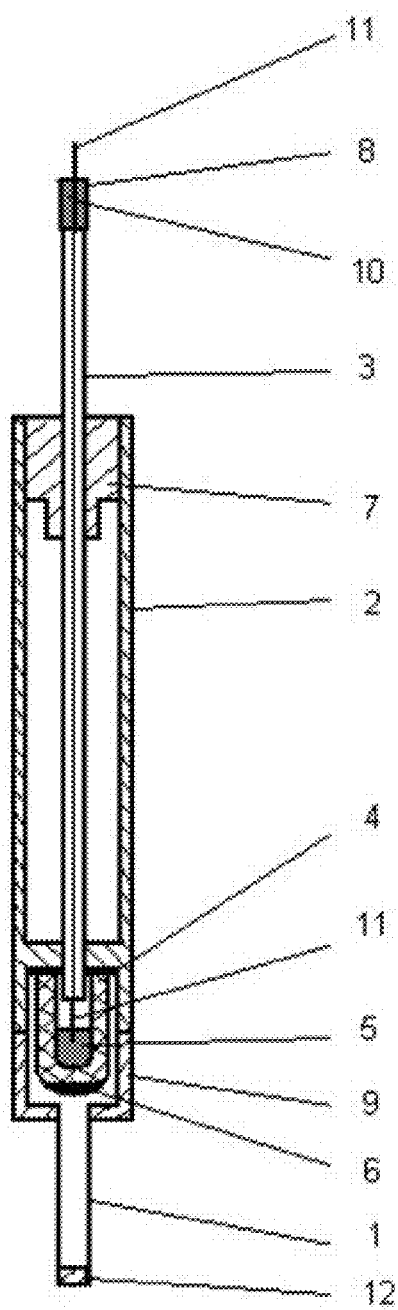

HYDROGEN DETECTOR FOR GAS AND FLUID MEDIA

CROSS-REFERENCE TO RELATED APPLICATIONS

This application is a US 371 Application from PCT/RU2015/000789 filed Nov. 16, 2015, which claims priority to Russia Application 2014150468 filed Dec. 15, 2014, the technical disclosures of which are hereby incorporated herein by reference.

TECHNICAL FIELD

The device pertains to instrumentation technology and can be used in energy production, metallurgy, chemical industry to determine hydrogen concentration in fluid and gas media in a wide range of temperatures and pressures.

BACKGROUND OF THE INVENTION

The electrochemical detector of hydrogen concentration in gas and fluid media is disclosed (refer to patent for the invention RU No. 2120624, IPC G01N27/417 Electrochemical Detector of Hydrogen Concentration in Gas and Liquid Media, published on Oct. 20, 1998).

The detector comprises a housing tightly connected with solid electrolyte hydrogen detector by means of metal. The solid electrolyte oxygen detector consists of a ceramic insulator, closed in the lower part with a plug made of solid electrolyte, a porous platinum electrode applied on the external side of the plug, the liquid metal oxide standard electrode placed inside the plug, current lead thermocouple attached to the lid that covers the top of the ceramic insulator. A selective membrane shaped as a crimped cup is welded to the lower part of the housing. A tablet of the porous insulating oxide is installed between the selective membrane and the solid electrolyte plug.

The disadvantage of the said device is relatively low leak-tightness of the inner cavity of the ceramic sensing element that occurs due to oxygen inleakage through the gap between the potential measuring unit and the central core that results in oxidation of the reference electrode and decrease in service life of the device and reliability of its operation.

The electrochemical detector of hydrogen concentration in fluids and gases is disclosed (I. G. Dmitriev, V. L. Orlov, B. A. Shmatko. Electrochemical Hydrogen Detector in Fluids and Gases/The collection of abstracts of Teplofizika-91 (Thermophysics-91) Intersectoral Conference, Obninsk, 1993. p. 134-136).

The detector comprises an electrochemical oxygen cell based on solid electrolyte made of stabilized zirconium dioxide, a liquid-metal reference electrode of Bi+Bi2O3 mixture, a measuring platinum electrode, which is placed in a sealed chamber filled with water vapor.

The disadvantages of the known technical solution are:
relatively low reliability and short service life of the device due to configuration complexity of the detector;
relatively low thermal durability and corrosion resistance of the solid electrolyte oxygen detector to water vapors;
relatively long response time and lack of sensitivity due to stabilization complexity of partial pressure of water vapor in the measuring chamber;
relatively low accuracy of hydrogen concentration measurement, which is caused by difficulty of maintaining stability of temperature and pipes.

A hydrogen detector for gas and fluid media is technically the closest to the claimed device (refer to patent for invention RU 2379672 IPC G01N27/417 Hydrogen Detector for Gas and Liquid Media, published on Jan. 20, 2008).

The hydrogen detector comprises a selective membrane, porous electrically insulating ceramics and a housing with a potential measuring unit inside, a ceramic sensing element made of solid electrolyte with a standard electrode in its cavity, a porous platinum electrode, applied to the external layer of the ceramic sensing element, silica fabric, joining material, a plug with a hole that covers the cross section of the cavity of the ceramic sensing element, a sealed lead-in tightly installed inside the housing above the ceramic sensing element, a doubly-clad cable potential measuring device that passes through the central hole of the sealed lead-in, a cylindrical bushing. The cavity of the housing between the sealed lead-in and the ceramic sensing element is leak-tight. The ceramic sensing element is designed as a cylinder interlinked with a part of the sphere, located in the lower part of the cylinder. The upper part of the external cylindrical surface of the ceramic sensing element is tightly connected to the inner side surface of the case by means of the joining material. The reference electrode is located in the cavity between the inner surface of the ceramic sensing element and the surface of the plug and occupies at least a part of the cavity. The external spherical part of the ceramic sensing element is covered with porous platinum electrode. The end of the central core of the potential measuring unit directed to the ceramic sensing element is brought out through the hole in the plug to the reference electrode. It enables an electric contact between the reference electrode and the lower part of the central core of the potential measuring unit. A part of the ceramic sensing element protrudes beyond the housing. The bushing shaped as a tube is connected to the lower part of the housing from the protruding part of the ceramic sensing element. The lower end of the bushing has a bottom with a center hole to which a selective membrane made of at least one tube is attached. The lower free end of the selective membrane is tightly closed with a plug. The cavity limited by the inner surface of the bushing, joining material, external part of the ceramic sensing element protruding beyond the housing and the inner surface of the selective membrane is leak-tight. The inner cavity of the bushing between the protruding part of the ceramic sensing element and the bushing bottom is filled with silica fabric. The porous electro-insulating ceramics designed as a cylinder is located with an annular gap to the inner surface of the selective membrane.

The disadvantage of the known device is relatively low leak-tightness (Disadvantage 1) of the inner cavity of the ceramic sensing element that can result in inleakages of oxygen to the inner cavity through the gap between the central core and the casing of the potential measuring unit and lead to oxidation of the reference electrode and decrease in service life of the device and reliability of its operation. Due to the absence of reliable leak-tightness of the upper part of the potential measuring unit (Disadvantage 2) moisture can infiltrate into the insulating material of the doubly-clad cable that can result in decrease of resistance of the central core and the cable sheath and, consequently, in the loss of the valid signal and detector reading errors.

INVENTION DISCLOSURE

The invention is aimed at increasing stability and reliability of hydrogen detector reading as well as its service life and reliability of its operation in a wide range of working medium parameters.

Technical Result

The technical result comprises enhanced measurement accuracy of the hydrogen detector reading by providing leak-tightness of the inner cavity of the ceramic sensing element and increase of electrical resistance between the central core and the casing of the potential measuring unit as a result of reliable leak-tightness of the upper part of the potential measuring unit as well as prevention of oxidation of the detector reference electrode.

As a solution to the stated problem, we claim the detector design which includes a selective membrane and a housing that has a potential measuring unit inside, a ceramic sensing element made of solid electrolyte. The ceramic sensing element cavity contains a reference electrode, a porous platinum electrode applied to the external layer of the ceramic sensing element. The sealed lead-in is tightly fixed inside the housing above the ceramic sensing element. The potential measuring unit that passes through the central core of the sealed lead-in and the lower bushing, wherein the ceramic sensing element is designed as a cylindrical element interlinked with the bottom located in the lower part of the cylindrical element. The external cylindrical surface of the ceramic sensing element is tightly connected to the inner side surface of the housing. The standard electrode is located in the inner cavity of the ceramic sensing element. The external part of the ceramic sensing element bottom is covered with a layer of porous platinum electrode. The end of the central core of the potential measuring unit is brought out into the reference electrode, wherein the electrical contact is provided between the reference electrode and the lower part of the central core of the potential measuring unit. The lower bushing designed as a tube is connected to the lower part of the housing from the side of the ceramic sensing element. The lower end of the lower bushing has a bottom with a center hole with an attached selective membrane made of at least one tube. The lower free end of the selective membrane is tightly closed with a plug. The cavity limited by the inner surface of the lower bushing, the external part of the bottom of the ceramic sensing element and the inner surfaces of the selective membrane and the plug is leak-tight. The detector is additionally equipped with an upper bushing and sealant that fills the ring-shaped cavity between the inner surface of the upper bushing wall and the external surface of the potential measuring unit. The sealant is a glass-ceramic consisting of silicon oxide ($SiO_2$)—45÷55 weight %, aluminum oxide ($Al_2O_3$)—4÷6 weight %, boric oxide ($B_2O_3$)—18÷22 weight %, titanium oxide ($TiO_2$)—9÷12 weight %, sodium oxide ($Na_2O$)—12÷15 weight %, potassium oxide ($K_2O$)—1÷2 weight % and magnesium oxide ($MgO$)—2÷3 weight %.

It is preferable to use the sealant consisting of silicon oxide ($SiO_2$)—50 weight %, aluminum oxide ($Al_2O_3$)—5 weight %, boric oxide ($B_2O_3$)—20 weight %, titanium oxide ($TiO_2$)—10 weight %, sodium oxide ($Na_2O$)—12 weight %, potassium oxide ($K_2O$)—1 weight % and magnesium oxide ($MgO$)—2 weight %.

The sealant fills the ring-shaped cavity between the inner surface of the upper bushing wall and the external surface of the potential measuring unit. The upper bushing is made of stainless steel. The selective membrane of the hydrogen detector is made of at least one tube.

The true values of the electromotive force of the detector are connected with the electromotive force initiated by the secondary instrument in the following way:

$$E_0 = E\left(\frac{R_0}{R_\mu} + 1\right),$$

where $E_0$ is the true value of the EMF of the detector;
E is the EMF initiated by the secondary instrument;
$R_0$ is inner electrical resistance of the detector (the ceramic sensing element);
$R_c$ is electrical resistance of the outer circuit including the inner resistance of the secondary instrument and the resistance of the central core that is the casing of the potential measuring unit cable.

Therefore, the equation demonstrates that the more the value of electrical resistance of the circuit, the closer the registered signal of the detector to the true value.

The detector design allows for increasing stability and reliability of the hydrogen detector reading, as well as its service life and reliability of its operation in a wide range of parameters of the working medium.

BRIEF DESCRIPTION OF THE DRAWINGS

The invention is illustrated with a FIGURE that shows a general view of the longitudinal axial cross-section of the detector.

EMBODIMENT OF INVENTION

The hydrogen detector comprises a selective membrane 1 and housing 2. A potential measuring unit 3, a ceramic sensing element 4 made of solid electrolyte are located inside the housing 2. The sensing element cavity contains a reference electrode 5, a porous platinum electrode 6 applied to the external layer of the ceramic sensing element 4. A sealed lead-in 7 is tightly fixed inside the housing 2 above the ceramic sensing element 4. The detector comprises upper 8 and lower 9 bushings, sealant 10, central core of the potential measuring unit 11 and a plug 12.

The sealant 10 fills the ring-shaped cavity between the inner surface of the upper bushing wall 8 and the external surface of the central core of the potential measuring unit 11.

The potential measuring unit 3 passes through the center core of the sealed lead-in 7.

The ceramic sensing element 4 is located in the lower part of the detector and designed as a cylindrical part interlinked with the bottom.

The external cylindrical surface of the ceramic sensing element 4 is tightly connected to the inner side surface of the housing 2.

The reference electrode 5 is located in the inner cavity of the ceramic sensing element 4.

The external part of the bottom of the ceramic sensing element 4 is covered with porous platinum electrode 6.

The end of the central core of the potential measuring unit 3 is brought out to the standard electrode 5.

Electrical contact is provided between the reference electrode 5 and the lower part of the potential measuring unit central core 11.

The lower bushing 9 designed as a tube is connected to the lower part of the housing 2 from the side of the ceramic sensing element 4.

The lower end of the bushing 9 has a bottom with a center hole to which a selective membrane 1 made of at least one tube is attached.

The lower free end of the selective membrane 1 is tightly closed with a plug 12.

The cavity limited by the inner surface of the lower bushing 9, the external part of the bottom of the ceramic sensing element 4 and the inner surfaces of the selective membrane 1 and the plug 12 is leak-tight.

The sealant 10 is a glass-ceramic consisting of silicon oxide ($SiO_2$)—50 weight %, aluminum oxide ($Al_2O_3$)—5 weight %, boric oxide ($B_2O_3$)—20 weight %, titanium oxide ($TiO_2$)—10 weight %, sodium oxide ($Na_2O$)—12 weight %, potassium oxide ($K_2O$)—1 weight % and magnesium oxide (MgO)—2 weight %.

The sealant is necessary to prevent ingress of oxygen from the air into the inner cavity of the detector and to avoid changes in the standard electrode 5 properties. The specified formula of the sealant was determined during a research. This sealant provides increased resistance to unfavorable operating conditions in corrosive environments at high temperature. Consequently, it provides leak-tightness of the detector for a longer operating life, loss-of-sealing risks decrease and fewer reading errors occur.

In a specific embodiment of the detector the upper bushing 8 is made of stainless steel.

The materials of the upper bushing 8 and the potential measuring unit 3 have an equal thermal-expansion coefficient, which allows to keep the detector operable under temperature changes within the range of 0-300° C.

The lower bushing 9 and the plugging 12 are made of nickel, grade NP0.

The sealed lead-in 7 and the upper bushing 8 are made of 12KH18N10T steel.

The ceramic sensing element 4 is made of partially stabilized zirconium dioxide and protrudes beyond the housing 2 for 6 mm.

The housing 2 is made of EI-852 ferritic-martensitic steel and has the following dimentions: the diameter is 15 mm, the length is 220 mm.

The porous platinum electrode 6 thickness is 20 μm.

The KNMS 2S double-clad cable is used as the potential measuring unit 3.

The selective membrane 1 comprises one tube made of NMg0.08v nickel. The sizes of the selective membrane 1 are the following: the diameter is 6 mm, the length is 40 mm, the wall thickness is 0.15 mm.

The standard electrode 5 is made of bismuth and bismuth oxide mixture.

The ratio between the area of the inner side surface of the selective membrane 1 and its voidage is 0.4 $mm^{-1}$.

A Pd protective layer chemically stable in the oxidation atmosphere covers the external and inner parts of the selective membrane.

The hydrogen detector applies the electrochemical method that allows to determine oxygen concentration by means of oxygen sensor made of solid oxide electrolyte.

The hydrogen detector functions as follows.

While placing the hydrogen detector in the test medium hydrogen that is contained in the medium reversibly diffuses through the selective membrane 1 into the steam hydrogen compartment changing the electromotive force of the detector. The steam hydrogen compartment is a cavity limited by the inner surface of the lower bushing 9, the external part of the ceramic sensing element 4 protruding beyond the case 6 and the inner surface of the selective membrane 1.

The electromotive force of the detector occurs due to differences in partial pressure of oxygen in the electrodes of the concentration cell. The scheme can be presented in the following way:

Me| the reference electrode (5)$\|ZrO_2.Y_2O_3\|$ the porous platinum electrode (6)$|H_2O, H_2|$ the selective membrane| the medium.

The steam hydrogen compartment has fixed partial vapor pressure of water and functions as a converter of hydrogen thermodynamic potential into oxidation potential of steam hydrogen mixture on the porous platinum electrode 6.

The total electromotive force is a hydrogen pressure function that is defined in the following way:

$$E = E_0 - \frac{R \cdot T}{n \cdot F} \ln \frac{P_{H_2O}}{P_{H_2}},$$

where: T is temperature, K; R is the gas constant, J/(mol*K); F is Faraday constant, J/mol; n is the number of the electrons participating in the reaction; $P_{H_2O}$ is partial vapor pressure of water in the steam hydrogen compartment, Pa; $P_{H_2}$ is partial hydrogen pressure in the test medium, Pa.

An electrical signal output to be supplied to the secondary instruments is provided by the potential measuring unit 3. Changes in oxygen concentration in the controlled medium result in changes of the value of the electrical signal that ensures its uninterrupted pickup and processing.

Delay of the detector is connected with hydrogen permeability through the the selective membrane 1 and it can be estimated by the signal delay time:

$$\tau_{3an} = \frac{dV}{SD},$$

Where d is the thickness of the selective membrane 1, m; D is the hydrogen diffusion coefficient in the material of the selective membrane 1, $m^2$/sec, S is the area of the selective membrane surface 1, $m^2$ and V is the inner voidage of the selective membrane 1, $m^3$.

INDUSTRIAL APPLICABILITY

The detector can be commercially manufactured. Moreover, its manufacturing does not require special equipment.

The invention claimed is:

1. A hydrogen detector for gas and fluid media comprising:
 a housing comprising:
  a ceramic sensing element of solid electrolyte, shaped as a hollow cylinder connected to an inner side surface of the housing at an external cylindrical surface, an external portion of the cylinder covered at a bottom end thereof with a layer of a porous platinum,
  a reference electrode located at the bottom end of the hollow cylinder,
  a central core end of a potential measuring unit extending into the hollow cylinder,
  a sealed lead-in fixed inside the housing above the ceramic sensing element,
  a lower bushing shaped as a tube, connected to and extending below a lower portion of the housing around the ceramic sensing element, with a lower end of the lower bushing having a hole; and a selective membrane comprising: at least one tube with a lower free end closed with a plug, the membrane attached by an upper free end to a bottom end of the lower bushing;

wherein the potential measuring unit passes through both the sealed lead-in and the lower bushing, such that the central core thereof is in electrical contact with the reference electrode;

wherein a leak-proof cavity of the detector is bounded by an inner surface of the lower bushing, by an external part of the bottom end of the ceramic sensing element, and by inner surfaces of the selective membrane and the plug;

wherein the hydrogen detector has an upper bushing installed in an upper part of the potential measuring unit;

wherein another cavity formed between the upper bushing and the potential measuring unit is filled with a ceramic glass sealant comprising:

silicon oxide ($SiO_2$) 45-55 weight %,
aluminum oxide ($Al_2O_3$) 4-6 weight %,
boric oxide ($B_2O_3$) 18-22 weight %,
titanium oxide ($TiO_2$) 9-12 weight %,
sodium oxide ($Na_2O$) 12-15 weight %,
potassium oxide ($K_2O$) 1-2 weight %, and
magnesium oxide (MgO) 2-3 weight %;

whereby the sealant fills the another cavity and the potential measuring unit to form a leak-tight seal; and wherein, when placing the hydrogen detector in a medium, hydrogen in the medium reversibly diffuses through the selective membrane into the leak-proof cavity bounded by the inner surface of the lower bushing, the external surface of the ceramic sensing element and an inner surface of the selective membrane.

2. The detector of claim 1 wherein the ceramic glass sealant comprises:

silicon oxide ($SiO_2$) 50 weight %,
aluminum oxide ($Al_2O_3$) 5 weight %,
boric oxide ($B_2O_3$) 20 weight %,
titanium oxide ($TiO_2$) 10 weight %,
sodium oxide ($Na_2O$) 12 weight %,
potassium oxide ($K_2O$) 1 weight %, and
magnesium oxide (MgO) 2 weight %.

3. The detector according to claim 1, wherein the upper bushing comprises stainless steel.

4. The detector according to claim 1, wherein the selective membrane is configured to permit hydrogen to reversibly diffuse through the selective membrane into the leak-proof cavity bounded by the inner surface of the lower bushing, the external surface of the ceramic sensing element, and an inner surface of the selective membrane.

5. The detector according to claim 1, wherein the solid electrolyte comprises partially-stabilized zirconium dioxide and wherein the ceramic sensing element protrudes beyond the housing.

6. The detector according to claim 1, wherein the selective membrane further comprises a Pd protective layer.

* * * * *